United States Patent
Seo et al.

(10) Patent No.: US 9,769,465 B2
(45) Date of Patent: Sep. 19, 2017

(54) HEAD MOUNTED DISPLAY DEVICE

(71) Applicant: SAMSUNG DISPLAY CO., LTD., Yongin, Gyeonggi-Do (KR)

(72) Inventors: Jeong Eun Seo, Seoul (KR); Jong Ho Chong, Hwaseong-si (KR)

(73) Assignee: Samsung Display Co., Ltd., Yongin-Si, Gyeonggi-do (KR)

( * ) Notice: Subject to any disclaimer, the term of this patent is extended or adjusted under 35 U.S.C. 154(b) by 2 days.

(21) Appl. No.: 14/843,289

(22) Filed: Sep. 2, 2015

(65) Prior Publication Data

US 2016/0165218 A1 Jun. 9, 2016

(30) Foreign Application Priority Data

Dec. 4, 2014 (KR) ........................ 10-2014-0172899

(51) Int. Cl.
*H04N 13/04* (2006.01)
*G02B 27/01* (2006.01)

(52) U.S. Cl.
CPC ......... *H04N 13/044* (2013.01); *G02B 27/017* (2013.01); *G02B 27/0172* (2013.01); *G02B 2027/014* (2013.01); *G02B 2027/0123* (2013.01); *G02B 2027/0127* (2013.01); *G02B 2027/0154* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 5,483,307 A | 1/1996 | Anderson | |
| 2013/0063817 A1* | 3/2013 | Santori | G02B 27/0172 359/471 |
| 2013/0207946 A1* | 8/2013 | Kim | G09G 3/3225 345/204 |
| 2013/0258461 A1* | 10/2013 | Sato | G02B 27/01 359/464 |
| 2014/0266990 A1* | 9/2014 | Makino | G02B 27/017 345/8 |
| 2016/0182900 A1* | 6/2016 | Leng | G09G 3/20 348/51 |
| 2016/0253934 A1* | 9/2016 | Wu | G09G 3/003 |

FOREIGN PATENT DOCUMENTS

| | | |
|---|---|---|
| JP | 2002-228972 | 8/2002 |
| JP | 2003-050374 | 2/2003 |
| JP | 2011-145488 | 7/2011 |
| KR | 1996-0013019 | 4/1996 |
| KR | 10-2007-0104960 A | 10/2007 |
| KR | 10-2012-0088754 | 8/2012 |
| KR | 10-2014-0025121 A | 3/2014 |

OTHER PUBLICATIONS

Market Research HIS Technology 3D, Head Mount Display, Displaybank.com, Sep. 25, 2009.

* cited by examiner

*Primary Examiner* — Joseph Haley
(74) *Attorney, Agent, or Firm* — Lee & Morse, P.C.

(57) ABSTRACT

A head mounted display device includes a first flexible display to display a left-eye image, a second flexible display to display a right-eye image, a first optical system between the first flexible display and a left eye of a user, a second optical system between the second flexible display and a right eye of the user, and a housing including the first flexible display, the second flexible display, the first optical system, and the second optical system.

16 Claims, 10 Drawing Sheets

HEAD MOUNTED DISPLAY DEVICE

CROSS-REFERENCE TO RELATED APPLICATION

Korean Patent Application No. 10-2014-0172899, filed on Dec. 4, 2014, and entitled, "Head Mounted Display Device," is incorporated by reference herein in its entirety.

BACKGROUND

1. Field

One or more embodiments herein relate to a head mounted display device.

2. Description of the Related Art

A head mounted display device generates images in a way that provides a virtual reality or augmented reality experience. Accordingly, such a device may be used for entertainment, gaming, military, medicine, or other purposes. However, if the user does not look straight ahead and/or moves his or her eye in up/down and left/right directions, one or more dead zones may appear in the user's line of sight. These dead zones may adversely affect display quality and realism.

SUMMARY

In accordance with one or more embodiments, a head mounted display device includes a first flexible display to display a left-eye image; a second flexible display to display a right-eye image; a first optical system between the first flexible display and a left eye of a user; a second optical system between the second flexible display and a right eye of the user; and a housing including the first flexible display, the second flexible display, the first optical system, and the second optical system.

The device may include a curvature changer to change a curvature of at least one of the first flexible display or the second flexible display. A three-dimensional image may be implemented by displaying the left-eye image in a manner different from the right-eye image. The device may include a depth analyzer to analyze the left-eye image and the right-eye image and to output a depth value, wherein the curvature changer is to change the curvature of at least one of the first flexible display or the second flexible display based on the depth value.

The curvature changer may decrease the curvature of at least one of the first flexible display or the second flexible display for a first value of the depth value and may increase the curvature of at least one of the first flexible display or the second flexible display for a second value of the depth value which is greater than the first value of the depth value.

The depth analyzer may output a plurality of depth values corresponding to a plurality of configuration objects in the left-eye image and the right-eye image, the curvature changer may include a plurality of micro actuators, and the micro actuators which correspond to the configuration objects may change the curvature of at least one of the first flexible display or the second flexible display based on the depth values. The micro actuators may be arranged on a substrate included in the first flexible display and a substrate included in the second flexible display in a matrix form.

In accordance with one or more other embodiments, a head mounted display device includes a flexible display to display a left-eye image on a left-eye pixel and a right-eye image on a right-eye pixel; an optical system between both eyes of a user and the flexible display, the optical system to separate the left-eye image and the right-eye image from each other for projection to corresponding eyes of the user; and a housing including the flexible display and the optical system.

The device may include a curvature changer to change a curvature of the flexible display. The device may include a depth analyzer to analyze the left-eye image and the right-eye image and may output a depth value of the image, wherein the curvature changer is to change the curvature of the flexible display based on the depth value. The curvature changer may decrease the curvature of the flexible display for a first value of the depth value and may increase the curvature of the flexible display for a second value of the depth value, wherein the second value is greater than the first value. The optical system may include a lenticular lens or a parallax barrier.

In accordance with one or more other embodiments, a head mounted display device includes a flexible display to time-divide and display a left-eye image and a right-eye image; an optical system to block sight of a right eye of a user during a period in which the left-eye image is displayed and to block sight of a left eye of the user during a period in which the right-eye image is displayed; and a housing including the flexible display and the optical system.

The device may include a curvature changer to change a curvature of the flexible display. The device may include a depth analyzer to analyze the left-type image and the right-eye image and to output a depth value of the image, wherein the curvature changer is to change the curvature of the flexible display based on the depth value.

The curvature changer may decrease the curvature of the flexible display for a first value of the depth value and may increase the curvature of the flexible display for a second value of the depth value, the second value greater than the first value. The optical system may include a shutter.

In accordance with one or more other embodiments, a head mounted display device may include a flexible display to output left-eye and right-eye images; a depth analyzer to generate a depth value based on the left-eye and right-eye images; and an adjuster to change the flexible display based on the depth value. The adjuster may change a curvature of the flexible display based on the depth value. The adjuster may decrease the curvature of the flexible display for a first value of the depth value and may increase the curvature of the flexible display for a second value of the depth value, wherein the second value is greater than the first value.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

Figure 1:
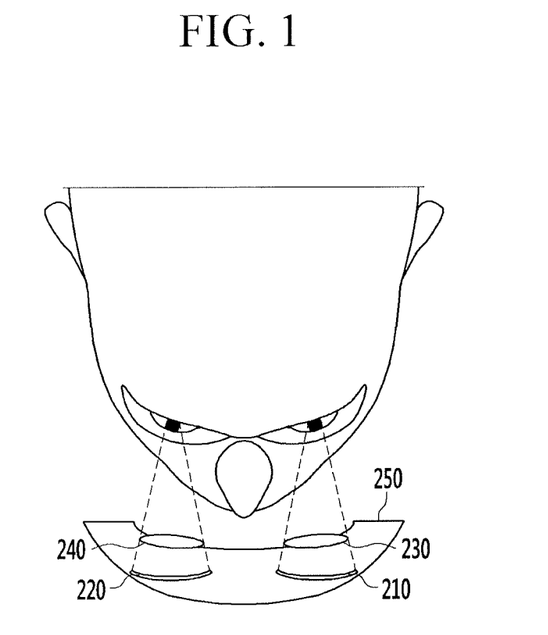
FIG. 1 illustrates an embodiment of a head mounted display device.

FIG. 1 illustrates an embodiment of a head mounted display device which includes a first flexible display 210, a second flexible display 220, a first optical system 230, a second optical system 240, and a housing 250.

The first flexible display 210 displays a left-eye image and the second flexible display 220 displays a right-eye image. The flexible display may, for example, be folded, rolled, or otherwise flexed, bent, or curved. In order for the display to have flexibility, a substrate of the device may be made, for example, of one or more plastics, e.g., acryl, polyethylene ether phthalate, polyethylene naphthalate, polycarbonate, polyarylate, polyether imide, polyether sulfone, polyester, and/or polyimide, rather than glass.

The first flexible display 210 and the second flexible display 220 may be bent in a shape surrounding the sight of a user so as to form a curved display shape. Since the sight of the user is surrounded by the curved display shape, dead zones are not detected even when even the user moves his or her eyes in up/down and left/right directions. As a result, the user is able to experience an improved realism effect.

The first optical system 230 is between the first flexible display 210 and the left eye of the user. The second optical system 240 may be between the second flexible display 220 and the right eye of the user. The first optical system 230 and the second optical system 240 may include magnifying lenses for magnifying the relatively small images displayed by the first flexible display 210 and the second flexible display 220. The magnifying lens may be, for example, a convex lens.

The first optical system 230 and the second optical system 240 may further include an aspheric lens that changes an optical path to prevent optical distortion that may be caused at the time of using the magnifying lens.

The housing 250 may include the first flexible display 210, the second flexible display 220, the first optical system 230, and the second optical system 240. The housing 250 may itself surround and be mounted on the user's head. Alternatively, the housing 250 may include a separate elastic head band so as to be fixed onto the head of the user. In another embodiment, the shape of the housing 250 may be different.

Figure 2:
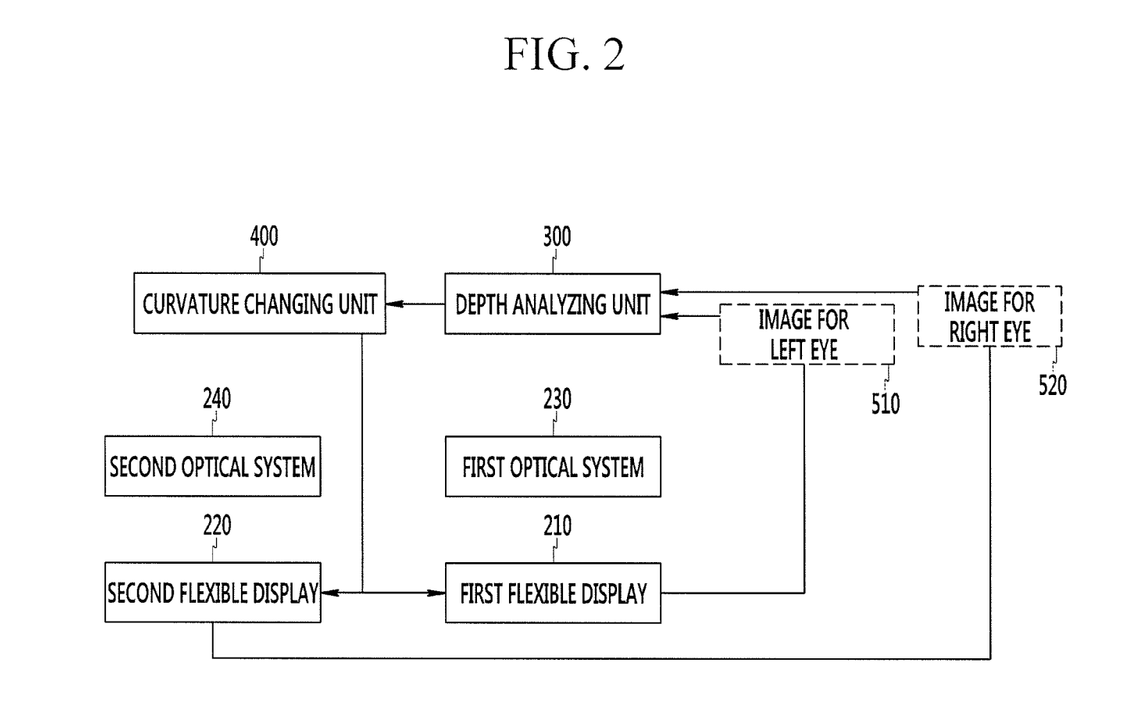
FIG. 2 illustrates an embodiment of a head mounted display device including a curvature changing unit and a depth analyzing unit.

FIG. 2 illustrates an embodiment of a head mounted display device which includes the first flexible display 210, the second flexible display 220, the first optical system 230, the second optical system 240, a depth analyzing unit 300, and a curvature changing unit 400.

The depth analyzing unit 300 may be separately formed outside the head mounted display device, and may transfer depth data to the curvature changing unit 400 in a wireless or wired way.

The curvature changing unit 400 may change the curvature of at least one of the first flexible display 210 or the second flexible display 220. For example, the curvature changing unit 400 may change a bent degree of each flexible display.

The curvature changing unit 400 may include at least one actuator. An actuator may collectively refer to a part that causes mechanical displacement using an electric field, a magnetic field, heat, pressure, or another form of energy. Other examples of an actuator include a mechanical actuator that uses a gear and a micro motor, and an actuator that changes shape using an electric and magnetic signal for a shape memory polymer. For example, the curvature changing unit 400 may also be implemented, for example, by applying a fine physical displacement to an edge of the substrate, that constitutes the flexible display, using a piezoelectric element. In another embodiments, the actuator may correspond to another part or element capable of changing curvature to bending the flexible display.

In changing the curvature of the first flexible display 210 or the second flexible display 220, whether the curvature is changed to some degree may be an issue. The curvature may also be changed depending on reference data by configuring a lookup table in advance. The depth analyzing unit 300 is provided to determine the curvature.

The depth analyzing unit 300 may analyze a left-eye image 510 and a right-eye image 520 and output a depth value. The curvature changing unit 400 may change the curvature based on the depth value output from the depth analyzing unit 300.

The left-eye image 510 and the right-eye image 520 may be stored, for example, in an embedded memory element of the head mounted display device. The left-eye image 510 and the right-eye image 520 may be wirelessly supplied to the head mounted display device based on data from an external source. The head mounted display device may include a separate signal processing chip which processes received image data for supply to the first flexible display 210 and the second flexible display 220.

In one embodiment, the curvature changing unit 400 may decrease the curvature for low values of the depth value and may increase the curvature for high values of the depth value.

Figure 3:
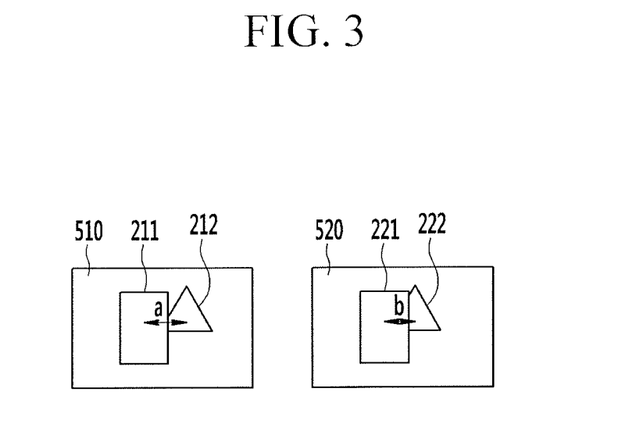
FIG. 3 illustrates an example of a derivation of a depth value based on a comparison of left-eye and right-eye images.

FIG. 3 illustrates an example for describing a derivation of the depth value based on a comparison of left-eye and right-eye images. Referring to FIG. 3, the left-eye image 510 includes a quadrangular object 211 and a triangular object 212, and the right-eye image 520 includes a quadrangular object 221 and a triangular object 222. The quadrangular objects 211 and 221 may be disposed at the same position in the left-eye image 510 and the right-eye image 520.

In the left-eye image 510, the triangular object 212 is spaced apart from the quadrangular object 211 by a distance of a. In the right-eye image 520, the triangular object 222 is spaced apart from the quadrangular object 221 by a distance of b. In one embodiment, the values of a and b may be different. As a result, the user may feel a different sense of distance from the quadrangular objects 211 and 221 to the triangular objects 212 and 222, and may feel a sense of depth of the triangular objects 212 and 222 disposed behind the quadrangular objects 211 and 221, that is, the depth.

Therefore, the depth analyzing unit 300 may analyze the left-eye image 510 and the right-eye image 520 and output the depth value of the image.

As an example, as illustrated in FIG. 3, a distance between the objects in the left-eye image and a distance between the objects in the right-eye image are extracted. The distances are then compared to determine to what extent they are different. The depth value may be determined to be high when the difference of the distances is large, and the depth value may be determined to be low when the difference of the distances is small. Small and large may be determined relative, for example, to one or more threshold values or ranges.

Figure 4A:
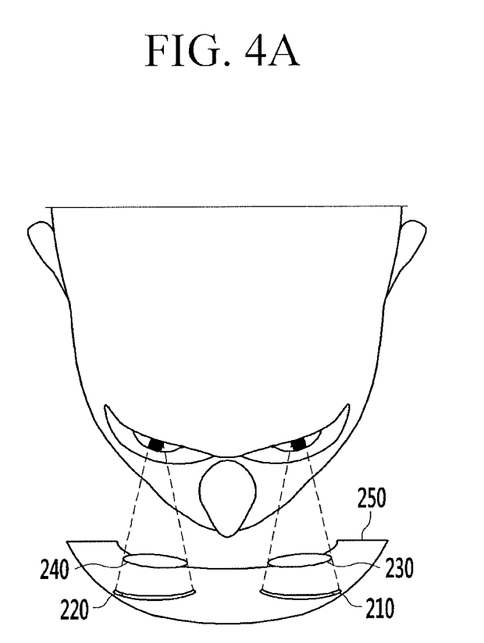
FIGS. 4A and 4B illustrate an embodiment of a head mounted display device having a curvature which is changed when the depth value is low.
Figure 4B:
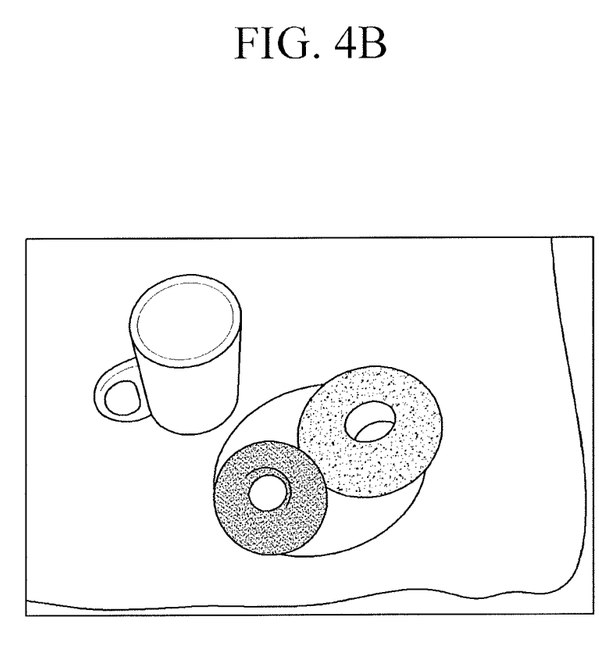

FIG. 4A illustrates an embodiment of the head mounted display device having a curvature which is changed when the depth value is low. FIG. 4B shows an example of a display image in the form of food on a table. The display image may correspond to an image which is intended to be visually recognized by the user by combining the left-eye image 510 and right-eye image 520.

Figure 5A:
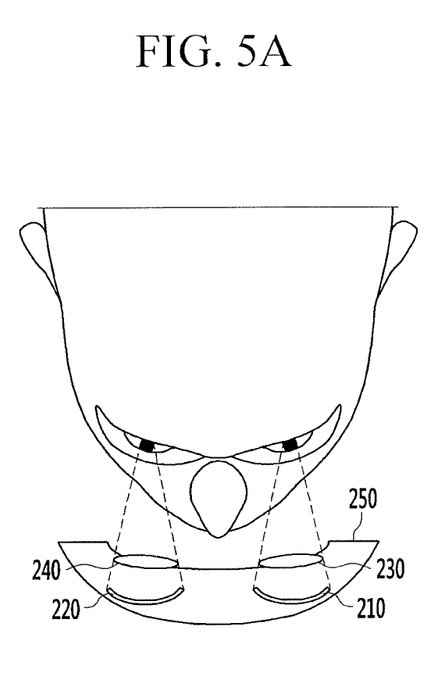
FIGS. 5A and 5B illustrates an embodiment of a head mounted display device having a curvature which is changed when the depth value is high.
Figure 5B:
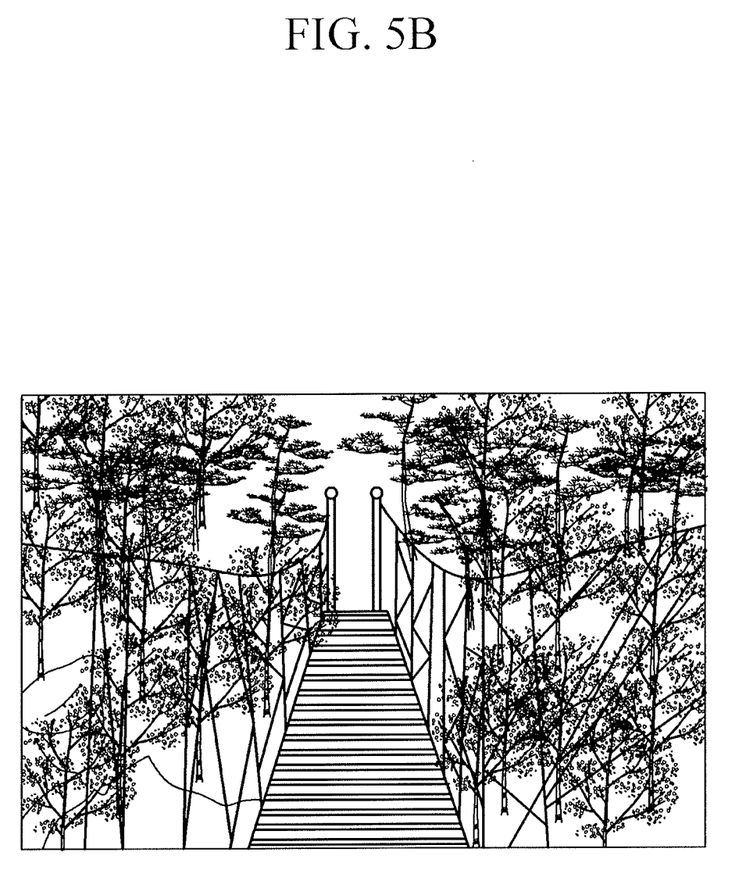

The display image of FIG. 4B, which is a flat image, has a relatively low depth value compared to the display image of FIG. 5B. Additionally, if the display image corresponds to text in a letter or book, the display image may also have a relatively low depth value.

FIG. 4A illustrates the first flexible display 210 and the second flexible display 220 having the curvature decreased by the curvature changing unit 400 based on a low depth value. For example, in FIG. 4A, a bent degree of the first flexible display 210 and the second flexible display 220 is smaller than that of FIG. 5A and may be close to a flat shape. Therefore, the user may view a clear screen in which letters or images are not distorted.

FIG. 5A illustrates an embodiment of the head mounted display device having a curvature which is changed when the depth value is high. FIG. 5B illustrates that the display image is a bridge spanning a valley. The display image of FIG. 5B, which is a three-dimensional image, effectively has a relatively high depth value compared to the image of FIG. 4B. Even when the height of an object in the image (e.g., a cliff) is expressed, the display image may have a high depth value.

Referring to FIG. 5A, the first flexible display 210 and the second flexible display 220 have a curvature increased by the curvature changing unit 400 based on the high depth value. For example, in FIG. 5A, the bent degree of the first flexible display 210 and the second flexible display 220 is larger than that of FIG. 4A and may be close to an oval shape. Therefore, the image may be perceived by the user with greater or even maximized realism, to such an extent that the user may feel he or she is actually in the display image.

Figure 6:
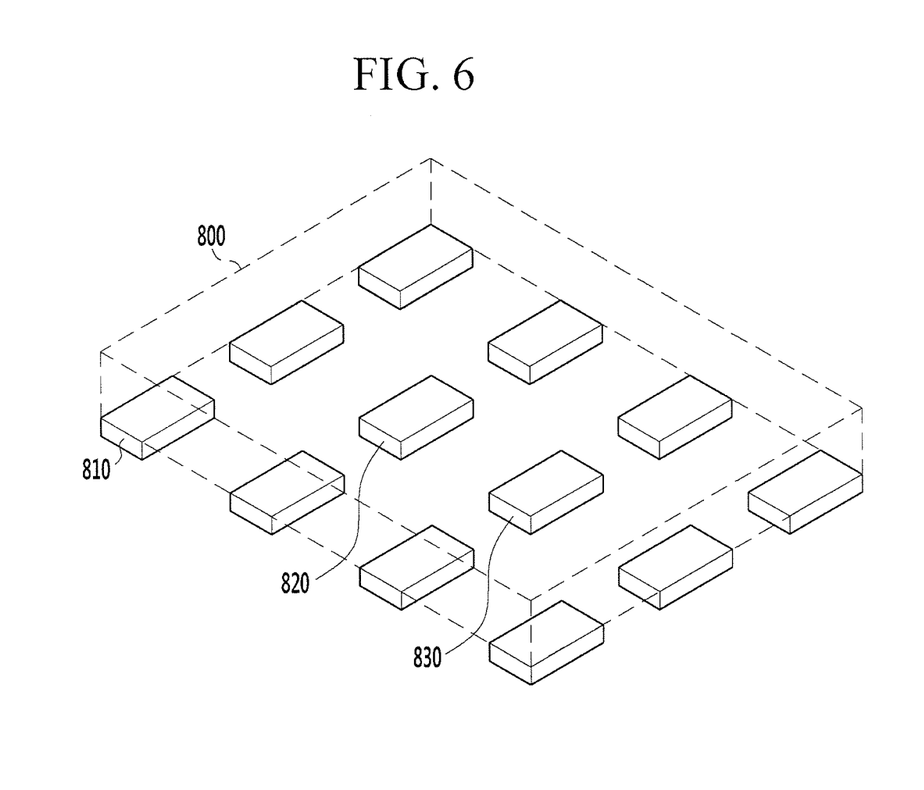
FIG. 6 illustrates a diagram embodiment of a curvature change depending on a plurality of depth values for a plurality of configuration objects of a display image.

FIG. 6 illustrates an embodiment of a curvature change depending on a plurality of depth values corresponding to a plurality of configuration objects in a display image.

In understanding this curvature change, reference is made once again to FIG. 3, where a plurality of configuration objects have a plurality of corresponding depth values. Since there is effectively no difference between the quadrangular objects 211 and 221 in the left-eye image 510 and the right-eye image 520, a depth value of 0 may be assigned. The triangular objects 212 and 222, on the other hand, may have a depth value of a-b. In this case, the unit for the depth value may be the number of pixels and may be differently defined depending, for example, on the manufacturer.

The depth analyzing unit 300 outputs the plurality of depth values corresponding to the plurality of configuration objects (the quadrangular objects and the triangular objects in FIG. 3) that constitute the left-eye image 510 and right-eye image 520.

In one embodiment, the curvature changing unit 400 includes a plurality of micro actuators 810. The micro actuators 810 may be arranged in a substrate 800 of the first flexible display 210 and a substrate of the second flexible display 220 in a matrix form. A plurality of pixel circuits may be arranged on the substrate 800 in a matrix form.

The micro actuators 810 may also be arranged in the substrate of the second flexible display 220 in the same way as the substrate 800. The micro actuators 810 corresponding to the configuration objects may change the curvature depending on the depth values. For example, since a micro actuator 810 corresponding to a position of the quadrangular object 211 has a depth value of the quadrangular object 211 of 0, the curvature of a portion corresponding to the substrate 800 may be maintained at 0.

Since a micro actuator 830 corresponding to a position of the triangular object 212 has the depth value of the triangular object 212 of a-b, the curvature of the portion corresponding to the substrate 800 may be changed to a value larger than 0. Therefore, the substrate may be partially bent depending on the depth values of the configuration objects. The arrangement of the micro actuator may be modified depending, for example, on the manufacturer and/or at the convenience of a user.

Figure 7:
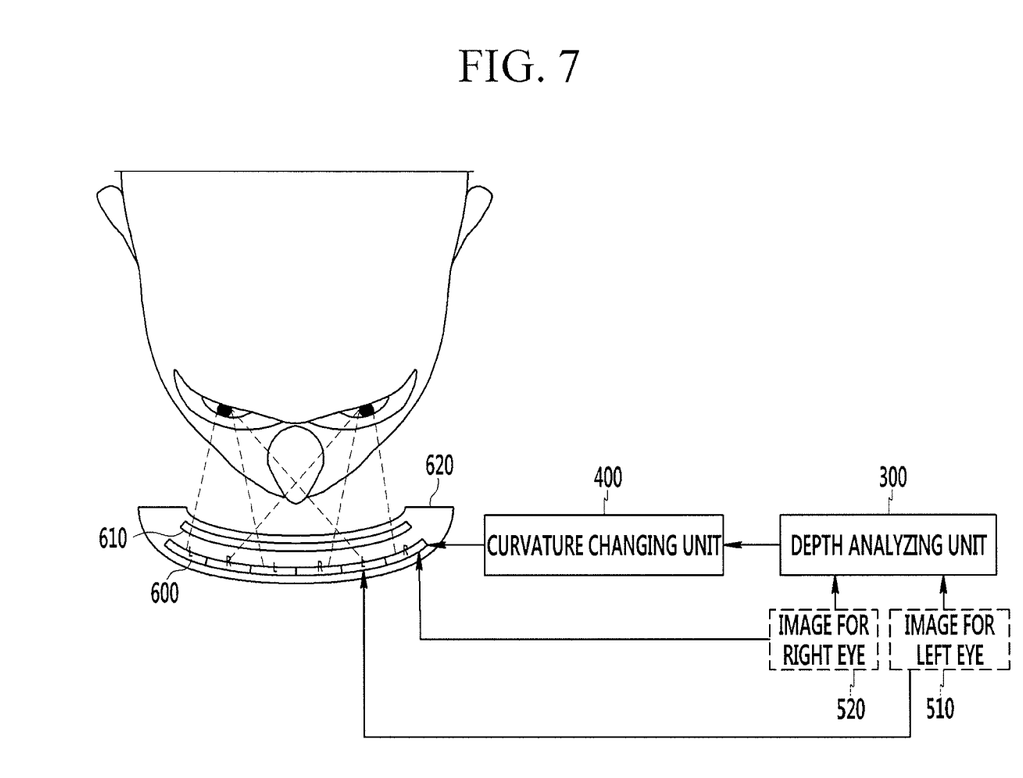
FIG. 7 illustrates another embodiment of a head mounted display device.

FIG. 7 illustrates another embodiment of a head mounted display device which includes a flexible display 600, an optical system 610, and a housing 620. The flexible display 600 displays a left-eye image 510 on a pixel L and displays a right-eye image 520 on a pixel R. The left-eye pixel L and the right-eye pixel R may be determined depending on the optical system 610, both eyes of the user, and/or a physical arrangement of the flexible display 600

The left-eye pixel L and the right-eye pixel R may have the same physical configuration, but may be differently classified in software depending, for example, on whether an applied display image is the left-eye image 510 or the right-eye image 520.

The optical system 610 may be between both eyes of the user and the flexible display 600 and may separate the left-eye image 510 and the right-eye image 520 from each other, so that each may be respectively projected to the left eye and the right eye of the user. The optical system 610 may include, for example, lenticular lens or a parallax barrier. The head mounted display device may further include the curvature changing unit 400 and the depth analyzing unit 300 as described above.

Figure 8:
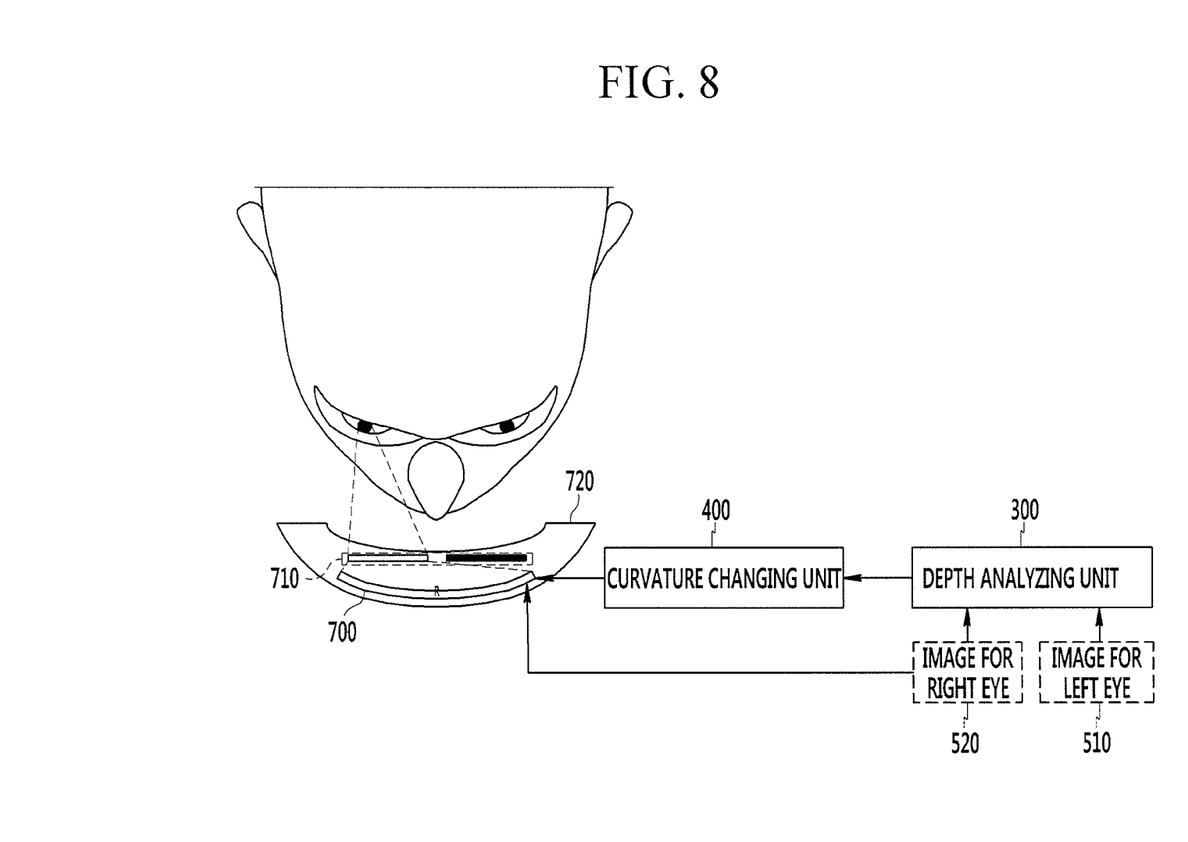
FIG. 8 illustrates another embodiment of a head mounted display device.

FIG. 8 illustrates another embodiment of a head mounted display device which includes a flexible display 700, an optical system 710, and a housing 720. The flexible display 700 may time-divide the left-eye image 510 and the right-eye image 520 for displayed.

The optical system 710 may block the sight of the right eye of the user during a period in which the left-eye image 510 is displayed, and may block the sight of the left eye of the user during a period in which the right-eye image 520 is displayed. The optical system 710 may include a shutter member. In this case, the optical system 710 may be have a shutter glass form. The head mounted display device may further include the curvature changing unit 400 and the depth analyzing unit 300 in the same principle as that described above.

The changers, analyzers, and other processing features of the embodiments described herein may be implemented in logic which, for example, may include hardware, software, or both. When implemented at least partially in hardware, the changers, analyzers, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the changers, analyzers, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the analyzer, adjuster, changer, and other processing features of the disclosed embodiments to execute the code or instructions for performing the methods and operations of the embodiments described herein.

By way of summation and review, one type of head mounted display device generates images for gaming and entertainment purposes. However, in this device, if the user does not look straight ahead and/or moves his or her eyes in up/down and left/right directions, one or more dead zones may appear in the user's line of sight. The dead zones may adversely affect display quality and significantly diminish realism.

In accordance with one or more of the aforementioned embodiments, the dead zones may be avoided by adjusting a curvature of the display based on a depth value derived from left-eye and right-eye images. As a result, a more realistic display is provided which may actually allow the user to feel as if he or she were in the image.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A head mounted display device, comprising:
a first flexible display to display a left-eye image;
a second flexible display to display a right-eye image;
a curvature changer to change a curvature of at least one of the first flexible display or the second flexible display based on a difference between the left-eye image and the right-eye image;
a first optical system between the first flexible display and a left eye of a user;
a second optical system between the second flexible display and a right eye of the user; and
a housing including the first flexible display, the second flexible display, the first optical system, and the second optical system.

2. The device as claimed in claim 1, wherein a three-dimensional image is implemented by displaying the left-eye image in a manner different from the right-eye image.

3. The device as claimed in claim 2, further comprising:
a depth analyzer to analyze the left-eye image and the right-eye image and to output a depth value, wherein the curvature changer is to change the curvature of at least one of the first flexible display or the second flexible display based on the depth value.

4. The device as claimed in claim 3, wherein the curvature changer is to decrease the curvature of at least one of the first flexible display or the second flexible display for a first value of the depth value and is to increase the curvature of at least one of the first flexible display or the second flexible display for a second value of the depth value which is greater than the first value of the depth value.

5. The device as claimed in claim 3, wherein:
the depth analyzer is to output a plurality of depth values corresponding to a plurality of configuration objects in the left-eye image and the right-eye image,
the curvature changer includes a plurality of micro actuators, and
the micro actuators which correspond to the configuration objects are to change the curvature of at least one of the first flexible display or the second flexible display based on the depth values.

6. The device as claimed in claim 5, wherein the micro actuators are arranged on a substrate included in the first flexible display and a substrate included in the second flexible display in a matrix form.

7. A head mounted display device, comprising:
a flexible display to display a left-eye image on a left-eye pixel and a right-eye image on a right-eye pixel;
a curvature changer to change a curvature of the flexible display based on a difference between the left-eye and right-eye images;
an optical system between both eyes of a user and the flexible display, the optical system to separate the left-eye image and the right-eye image from each other for projection to corresponding eyes of the user; and
a housing including the flexible display and the optical system.

8. The device as claimed in claim 7, further comprising:
a depth analyzer to analyze the left-eye image and the right-eye image and to output a depth value of the image, wherein the curvature changer is to change the curvature of the flexible display based on the depth value.

9. The device as claimed in claim 8, wherein:
the curvature changer is to decrease the curvature of the flexible display for a first value of the depth value and to increase the curvature of the flexible display for a second value of the depth value, wherein the second value is greater than the first value.

10. The device as claimed in claim 7, wherein the optical system includes a lenticular lens or a parallax barrier.

11. A head mounted display device, comprising:
a flexible display to time-divide and display a left-eye image and a right-eye image;
a curvature changer to change a curvature of the flexible display based on a difference between the left-eye image and the right-eye image;
an optical system to block sight of a right eye of a user during a period in which the left-eye image is displayed and to block sight of a left eye of the user during a period in which the right-eye image is displayed; and
a housing including the flexible display and the optical system.

12. The device as claimed in claim 11, further comprising:
a depth analyzer to analyze the left-eye image and the right-eye image and to output a depth value of the image, wherein the curvature changer is to change the curvature of the flexible display based on the depth value.

13. The device as claimed in claim 12, wherein the curvature changer is to decrease the curvature of the flexible display for a first value of the depth value and to increase the curvature of the flexible display for a second value of the depth value, the second value greater than the first value.

14. The device as claimed in claim 11, wherein the optical system includes a shutter.

15. A head mounted display device, comprising: a flexible display to output left-eye and right-eye images; a depth analyzer to generate a depth value based on the left-eye and right-eye images; and an adjuster to change a curvature of the flexible display based on the depth value, the depth value based on a difference between the left-eye image and the right-eye image.

16. The device as claimed in claim 15, wherein the adjuster is to decrease the curvature of the flexible display for a first value of the depth value and to increase the curvature of the flexible display for a second value of the depth value, wherein the second value is greater than the first value.

* * * * *